United States Patent [19]

Sydansk

[11] Patent Number: 4,723,605
[45] Date of Patent: Feb. 9, 1988

[54] ACCELERATED POLYMER GELATION PROCESS FOR OIL RECOVERY APPLICATIONS

[75] Inventor: Robert D. Sydansk, Littleton, Colo.

[73] Assignee: Marathon Oil Company, Findlay, Ohio

[21] Appl. No.: 939,667

[22] Filed: Dec. 9, 1986

[51] Int. Cl.$^4$ .................. E21B 33/138; E21B 43/26
[52] U.S. Cl. ............................. 166/295; 166/270; 166/300; 166/308; 252/8.551; 523/130
[58] Field of Search ............... 166/270, 271, 294, 295, 166/300, 308; 252/8.551; 405/264; 523/130, 132

[56] References Cited

U.S. PATENT DOCUMENTS

| | | | |
|---|---|---|---|
| Re. 32,114 | 4/1986 | Argabright et al. | 166/252 |
| 2,294,294 | 8/1942 | Grebe | 166/295 |
| 2,368,424 | 1/1945 | Reistle, Jr. | 166/295 X |
| 3,302,717 | 2/1967 | West et al. | 166/295 X |
| 3,749,172 | 7/1973 | Hessert et al. | 166/295 X |
| 3,762,476 | 10/1973 | Gall | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 2/1977 | Gall | 166/294 |
| 4,470,915 | 9/1984 | Conway | 166/308 X |
| 4,488,975 | 12/1984 | Almond | 166/308 X |
| 4,644,073 | 2/1987 | Mumallah et al. | 252/8.554 X |

OTHER PUBLICATIONS

Von Erdman, "Condensation of Mononuclear Chromium (III) Salts to Polynuclear Compounds," *Das Leder*, Eduard Roether Verlag, Darmstadt, Germany, 1963, v. 14, pp. 249–266.

Udy, Marvin J., *Chromium vol. 1: Chemistry of Chromium and Its Compounds*, Reinhold Publ. Corp., N.Y., 1956, pp. 229–233.

Cotton and Wilkinson, *Advanced Inorganic Chemistry* 3rd Ed., John Wiley & Sons, Inc., N.Y., 1972, pp. 836–839.

Shuttleworth and Russel, *Journal of the Society of Leather Trades' Chemists*, "The Kinetics of Chrome Tannage Part I.," United Kingdom, 1965, v. 49, pp. 133–154.

Shuttleworth and Russel, *Journal of the Society of Leather Trades' Chemists*, "Part III.," United Kingdom, 1965, v. 49, pp. 251–260 and Part IV, pp. 261–268.

*Primary Examiner*—George A. Suchfield
*Attorney, Agent, or Firm*—Jack L. Hummel; Rodney F. Brown

[57] ABSTRACT

A process for accelerating the gelation rate of a carboxylate-containing polymer used in oil recovery applications. A gel is prepared by mixing a single aqueous gelation solution at the surface made up of the polymer and a crosslinking agent containing a chromic carboxylate complex and a simple mineral acid. The concentration of the simple mineral acid is selected at a level which achieves the desired rate of gelation for a given application.

19 Claims, No Drawings

ACCELERATED POLYMER GELATION PROCESS FOR OIL RECOVERY APPLICATIONS

BACKGROUND OF THE INVENTION

1. Technical Field

The invention relates to an oil recovery process and more particularly to a process of preparing a polymer gel at an accelerated rate for oil recovery applications.

2. Description of Related Art

Polymer gels have potential application to a number of oil recovery processes including cementing, fracturing and conformance improvement. Poor vertical conformance results form the vertical juxtaposition of relatively high permeability geologic regions to relatively low permeability regions within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability regions of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment region of the formation and gel in situ.

It is generally held that effective polymer/crosslinking agent systems necessitate sequential injection of the gel components followed by in situ mixing because gel systems mixed on the surface are difficult to regulate. Systems mixed on the surface often gel at an excessive rate, forming gel balls before they can effectively penetrate the treatment region. However, in practice, conformance treatments such as that disclosed in U.S. Pat. No 3,762,476 using sequentially injected gel systems have proven unsatisfactory because of the inability to achieve complete mixing and gelation in the formation. As a result, gels only form at the interface of the unmixed gel components and often in regions remote from the desired treatment region. Likewise, processes employing sequentially injected gel systems for cementing and fracturing applications have proven unsatisfactory because the resulting gels do not have sufficient strength and integrity to withstand the stresses encountered in oil recovery processes.

A need exists for a gelation process wherein the gelation solution gels at a rapid yet orderly and controlled rate. A need exists for a process wherein the gelation solution substantially penetrates the desired treatment region of a subterranean hydrocarbon-bearing formation and sets up without undue delay as an effective uniform gel. A need exists for a gelation process which can produce a range of versatile gels having the desired predetermined strengths and integrities for conformance-improving, cementing, or fracturing applications.

SUMMARY OF THE INVENTION

The present invention provides a process for improving hydrocarbon recovery from a subterranean hydrocarbon-bearing formation penetrated by a production and/or injection well. According to one embodiment, the process improves vertical and areal conformance in the formation and correspondingly improves flow profiles and sweep efficiencies of injected and/or produced fluids in the formation. According to another embodiment, the process provides a strong, permanent material for cementing jobs. According to yet another embodiment, the process provides an effective fluid for formation fracturing. These objectives and others are achieved by a polymer gelation process employing a two-component crosslinking agent.

The process comprises preparing a single aqueous gelation solution at the surface containing a high molecular weight, water-soluble, carboxylate-containing polymer and a crosslinking agent comprising a chromic carboxylate complex and a simple mineral acid. The practitioner controls the gelation rate of the solution to achieve one of three gelation scenarios: (1) the solution gels to completion at the surface; (2) the solution partially gels at the surface; and (3) the solution remains substantially ungelled at the surface. In any case, the resulting gelation solution is injected into a desired subterranean region for a selected hydrocarbon recovery application.

The present invention enables the practitioner to control the gelation rate or time required for complete gelation and ultimately the overall gelation scenario by increasing or decreasing the relative amount of mineral acid added to the crosslinking agent. The gelation scenario employed in the process is predetermined according to the desired gel function, i.e., fracturing, cementing or conformance improvement, and the specific demands of the subterranean formation.

The resultant gel is a viscous continuous single-phase composition comprised of the polymer and crosslinking agent. Once the gel is in place for its desired function as a cement or flow diverter or the gel has completed a fracturing treatment, fluids may be injected into or produced from the hydrocarbon-bearing regions of the formation in fluid communication with the wellbore. The gel in place is substantially incapable of flowing from the treatment region and is substantially permanent and resistant to in situ degradation.

The process provides distinct advantages over known gelation processes. The practitioner of the present invention can fully prepare and mix a single gelation solution at the surface to achieve a controlled gelation rate. Gelation rate has been found to be an involved function of many gelation parameters including temperature, pH, gel component concentrations, polymer molecular weight, degree of polymer hydrolysis, etc. Although a practitioner can produce gels over a range of orderly gelation rates and finite periods of time by careful selection of values for the above-stated parameters as disclosed in now U.S. Pat. No. 4,683,444 the present invention enables the practitioner to design a gelation process having a gelation rate and time which are selected from a broad range of rates and times without substantially altering the majority of gelation parameters.

The present process is particularly advantageous because it enables the practitioner to predetermine a specific desired gelation rate by selecting the value of only one relatively independent parameter, mineral acid concentration in the crosslinking agent. Although the gelation rate can be predetermined by varying other gelation parameters as noted above, simply controlling the mineral acid concentration is often economically and/or operationally more attractive. It may be undesirable to vary other gelation parameters because they are functionally correlated to final gel properties such as gel strength and stability. If one varies these parameters to achieve a given gelation rate, one could adversely affect the final gel properties.

The present process allows one to set the gelation rate as a function of only one gelation parameter without substantially altering the final gel properties. In addition, the present process provides a broader range of achievable gelation rates. That is, the use of a simple mineral acid enables more accelerated, yet still controlled, gelation rates than other controlled gelation methods. The resultant gel has sufficient strength and stability to meet the demands of the formation and the specific hydrocarbon recovery process employed.

DESCRIPTION OF PREFERRED EMBODIMENTS

The present invention is described in the context of specific terms which are defined as follows. The formation consists of two general regions, the "matrix" and "anomalies". An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subterranean material of continuous geologic properties which extend in the horizontal direction. "Vertical conformance" is a measure of the degree of geologic uniformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile." "Plugging" is a substantial reduction in permeability in a region of a formation.

The term "gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged volume into a less permeable region of the formation adjoining the volume when injected into the volume.

The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region when injected therein.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a carboxylate-containing polymer and a crosslinking agent. The carboxylate-containing polymer may be any crosslinkable, high molecular weight, water-soluble, synthetic polymer or biopolymer containing one or more carboxylate species. The average molecular weight of the carboxylate-containing polymer is in the range of about 10,000 to about 50,000,000 and preferably about 100,000 to about 20,000,000, and most preferably about 200,000 to about 15,000,000. The polymer concentration in the solution is about 500 ppm up to the solubility limit of the polymer in the solvent or the rheological constraints of the polymer solution and preferably about 3000 to about 30,000 ppm.

Biopolymers useful in the present invention include polysaccharides and modified polysaccharides. Exemplary biopolymers are xanthan gum, guar gum, carboxymethylcellulose, o-carboxychitosans, hydroxyyethylcellulose, hydroxyproplcellulose, and modified starches. Useful synthetic polymers include inter alia acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The crosslinking agent is a simple mineral acid and a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$$[Cr_3(CH_3CO_2)_6(OH)_2]^{+1};$$

$$[Cr_3(OH)_2(CH_3CO_2)_6]NO_3 \cdot 6H_2O;$$

$$[Cr_3(H_2O)_2(CH_3CO_2)_6]^{+3};$$

$$[Cr_3(H_2O)_2(CH_3CO_2)_6](CH_3CO_2)_3 \cdot H_2O; \text{ etc.}$$

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and latic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists,* "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdam, *Das Leder,* "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds,* Reinhold Publishing Corp., N.Y., 1956, pp. 229–233; and Cotton and Wilkinson, *Advanced Inorganic Chemistry 3rd Ed.,* John Wiley & Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

The simple mineral acids of the present invention are inorganic acids comprising dissociated hydrogen ions and inorganic anions in water. Exemplary simple mineral acids in the present invention include hydrochloric acid, nitric acid, sulfuric acid and the like.

The gel is formed by admixing a carboxylate-containing polymer and crosslinking agent at the surface to form a single injectable gelation solution. Surface admixing broadly encompasses inter alia mixing the solution in bulk at the surface prior to injection or simultaneously mixing the solution at or near the wellhead by in-line mixing means while injecting it. Admixing is preferably accomplished by first combining the complex and simple mineral acid in an appropriate aqueous solvent to form the crosslinking agent solution. The crosslinking agent solution is then mixed with an aqueous polymer solution to produce the gelation solution. Among less preferred alternatives within the scope of admixing, is adding the simple mineral acid directly to the aqueous polymer solution followed by the complex to form the gelation solution. The weight ratio of carboxylate-containing polymer to crosslinking agent in the gelation solution is about 1:1 to 500:1, preferably about 2.5:1 to 200:1, and most preferably about 5:1 to 50:1.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to produce a gel at a predetermined gelation rate as a function of the crosslinking agent composition. The gelation rate is defined as the degree of gel formation as a function of time or, synonymously, the rate of crosslinking in the gelation solution. The degree of crosslinking may be quantified in terms of gel viscosity and/or strength.

The practitioner generally selects a ratio of the complex to the simple mineral acid in the crosslinking agent solution by weight within the range of about 1000:1 to about 1:1 and most preferably about 50:1 to about 2:1 to achieve a predetermined gelation rate or time of gelation. The gelation rate of the gelation solution generally increases with increasing addition of simple mineral acid to the crosslinking agent solution up to a maximum. This maximum is denoted by the lower limit of the above-stated ratio. Below this limit the gelation rate declines with increasing acid addition. Gelation is preferably substantially complete within a time range of nearly instantaneous up to about 48 hours or more.

The predetermined gelation rate advantageously enables preparation of the gelation solution at the surface, injection of the solution as a single uniform slug into the wellbore, and displacement of the entire solution into the desired subterranean zone within a relatively short period of time so that the well may be activated for injection or production thereafter. The process can be designed to gel the solution completely at the surface, partially gel the solution at the surface and complete the gelation reaction in situ, or conduct the entire gelation reaction in situ.

The present gelation mechanism enables the practitioner to design a gelation solution which can be injected into a formation at a desired injection rate with little resistance to injectivity. Where gelation is in situ, the solution is preferably gelled rapidly after it is in place in the desired subterranean region to minimize lost production from shut in of injection and/or production wells.

The present process is applicable to a number of hydrocarbon recovery applications. According to one embodiment, the process is applicable to conformance treatment of formations under most conditions and is specific to treating regions within the formation which are in fluid communication with an injection or production well. The flowing gel is especially applicable to the treatment of anomalies such as streaks of relatively high permeability, fractures of fracture networks in direct communication via the anomaly with an injection well but not also in direct communication via the anomaly with a production well. The ultimate gel is termed a flowing gel as defined herein because it would flow if unconfined on the surface. However, the flowing gel is sufficiently crosslinked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the solution can be injected into a selected high permeability zone of the matrix and crosslinked to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are often preferred for treatment of high permeability zones in direct communication with production wells because of their increased strength.

Conformance treatment of regions in direct communication with a production well by the process of the present invention can effectively improve the hydrocarbon productivity of the well and/or decrease the water to hydrocarbon ratio of the produced fluids.

According to other embodiments, the present process is applicable to cementing and fracturing operations. The gelation solution is prepared in the manner described above and applied according to conventional cementing or fracturing methods known in the art. The nonflowing rigid gel produced according to the present invention is the preferred cement composition for cementing jobs. The composition is particularly applicable to remedial squeeze-cementing jobs which can also effectively improve the hydrocarbon productivity of a production well and/or decrease the water to hydrocarbon ratio of the produced fluids. The cement composition is also applicable to plugging abandoned wells. The flowing gel produced according to the present invention is the preferred fracturing fluid.

The following examples demonstrate the practice and utility of the present invention but are not to be construed as limiting the scope thereof.

Examples 1-3 are formatted as tables of data which describe the formulation and maturation of one or more gels. Each gel is represented in a table by a single experimental run. Data include the conditions for producing the gel and the quantitative or qualitative strength of the produced gel. The tables display data in a two-tier format. The first tier is values of the gelation conditions which vary among the different runs in the table but are constant for any given run. The second tier is the gel strength which varies as a function of gelation time (expressed in hours) within each run. Qualitative gel strength is expressed in alphabetic code.

The following gel strength code is useful for interpreting the tables.

GEL STRENGTH CODE

A: No detectable continuous gel formed: the bulk of the gelation solution appears to have the same viscosity as the original polymer solution although in some cases isolated highly viscous gel balls may be present.

B: Highly flowing gel: the gel appears to be only slightly more viscous than the initial polymer solution.

C: Flowing gel: most of the gel flows to the bottle cap by gravity upon inversion.

D: Moderately flowing gel: only a small portion (5–10%) of the gel does not readily flow to the bottle cap by gravity upon inversion (usually characterized as a tonguing gel).

E: Barely flowing gel: the gel can barely flow to the bottle cap and/or a significant portion (>15%) of the gel does not flow by gravity upon inversion.

F: Highly deformable nonflowing gel: the gel does not flow to the bottle cap by gravity upon inversion.

G: Moderately deformable nonflowing gel: the gel deforms about half way down the bottle by gravity upon inversion.

H: Slightly deformable nonflowing gel: only the gel surface slightly deforms by gravity upon inversion.

I: Rigid gel: there is no gel surface deformation by gravity upon inversion.

J: Ringing rigid gel: a tuning fork-like mechanical vibration can be felt upon tapping the bottle.

All the polymer solutions of Example 1-3 are prepared by diluting aqueous acrylamide polymer solutions with an aqueous solvent. The qualitative data are obtained by combining the dilute polymer solution with a crosslinking agent solution in a widemouth bottle. The sample is gelled in the capped bottle and the qualitative gel strength is determined by periodically inverting the bottle.

Samples of gelation solutions in Example 1-3 are prepared by combining a 2% by weight polyacrylamide solution in Denver, Colo. tap water with a crosslinking agent solution such that the weight ratio of polymer to crosslinking agent in the gelation solution is always 20:1. (The polyacrylamide is 2.0% hydrolyzed and has a molecular weight of 11,000,000. The polymer solution has a pH of 8.6.) The sample is gelled at room temperature and the qualitative gel strength is determined by periodically inverting the sample.

The Crosslinking agent solution is that of the present invention (i.e., a simple mineral acid and a chromic acetate complex). The cross-linking agent solution is prepared by dissolving solid $CrAc_3 \cdot H_2O$ and the specified simple mineral acid in water. The specific composition of the crosslinking agent solution for each run is described at the top of the tables in Examples 1-3.

EXAMPLE 1

| | Mineral Acid: HCl | | | | | | | |
|---|---|---|---|---|---|---|---|---|
| | Run Number | | | | | | | |
| | 1 | 2 | 3 | 4 | 5 | 6 | 7 | 8 |
| wt % CrAc | 10.0 | 10.0 | 10.0 | 10.0 | 10.0 | 10.0 | 10.0 | 10.0 |

-continued

| Mineral Acid: HCl | | | | | | | | |
|---|---|---|---|---|---|---|---|---|
| | Run Number | | | | | | | |
| | 1 | 2 | 3 | 4 | 5 | 6 | 7 | 8 |
| complex | | | | | | | | |
| wt % mineral acid | 0 | 1.0 | 2.0 | 3.0 | 4.0 | 6.0 | 9.0 | 10.0 |
| Time (hr) | Gel Code | | | | | | | |
| 0.5 | C | D | E | E | E | D | C | C |
| 1.0 | C | H | H | H | F | D | D | D |
| 2.0 | D | H | H | H | G | D | D | D |
| 3.0 | D | I | I | I | H | D | D | D |
| 4.0 | D | I | I | I | H | D | D | D |
| 5.0 | D | I | I | I | H | D | D | D |
| 6.0 | D | I | I | I | I | D | D | D |
| 7.0 | E | I | I | I | I | E | D | D |
| 24 | H | I | I | I | I | H | D | D |
| 48 | I | J | J | J | J | I | E | E |
| 72 | I | J | J | J | J | I | F | F |
| 96 | J | J | J | J | J | I | G | G |
| 168 | J | J | J | J | J | I | I | G |
| 300 | J | J | J | J | J | I | I | H |
| 864 | J | J | J | J | J | I | I | I |

EXAMPLE 2

| Mineral Acid: HNO₃ | | | | | | | | |
|---|---|---|---|---|---|---|---|---|
| | Run Number | | | | | | | |
| | 1 | 2 | 3 | 4 | 5 | 6 | 7 | 8 |
| wt % CrAc complex | 10.0 | 10.0 | 10.0 | 10.0 | 10.0 | 10.0 | 10.0 | 10.0 |
| wt % mineral acid | 0 | 1.73 | 3.45 | 5.71 | 6.91 | 10.4 | 13.8 | 17.3 |
| Time (hr) | Gel Code | | | | | | | |
| 0.5 | A | F | H | H | H | G | A | A |
| 1.0 | A | H | H | H | H | H | D | A |
| 2.0 | B | I | I | I | I | I | E | A |
| 3.0 | C | I | I | I | I | I | F | A |
| 4.0 | C | I | I | I | I | I | F | A |
| 5.0 | C | I | I | I | I | I | G | A |
| 6.0 | D | I | I | I | I | I | G | A |
| 7.0 | F | I | I | I | I | I | G | A |
| 24 | H | J | J | J | J | J | H | B |
| 48 | I | J | J | J | J | J | H | B |
| 72 | I | J | J | J | J | J | I | B |
| 96 | I | J | J | J | J | J | I | C |
| 168 | J | J | J | J | J | J | I | C |
| 300 | J | J | J | J | J | J | I | C |

EXAMPLE 3

| Mineral Acid: H₂SO₄ | | | | | | | | |
|---|---|---|---|---|---|---|---|---|
| | Run Number | | | | | | | |
| | 1 | 2 | 3 | 4 | 5 | 6 | 7 | 8 |
| wt % CrAc complex | 10.0 | 10.0 | 10.0 | 10.0 | 10.0 | 10.0 | 10.0 | 10.0 |
| wt % Mineral Acid | 0 | 2.68 | 5.37 | 8.06 | 10.8 | 16.1 | 21.5 | 26.8 |
| Time (hr) | Gel Code | | | | | | | |
| 0.5 | A | H | H | G | A | A | A | A |
| 1.0 | A | H | H | H | A | A | A | A |
| 2.0 | B | I | I | H | B | B | B | B |
| 3.0 | C | I | I | H | C | B | B | B |
| 4.0 | C | I | I | I | C | B | B | B |
| 5.0 | C | I | I | I | C | B | B | B |
| 6.0 | D | I | I | I | C | B | B | B |
| 7.0 | F | I | I | I | D | B | B | B |
| 24 | H | J | J | I | F | B | B | B |
| 48 | I | J | J | I | G | B | B | B |
| 72 | I | J | J | J | H | B | B | B |
| 96 | I | J | J | J | H | C | C | C |
| 168 | J | J | J | J | I | C | C | C |

-continued

| Mineral Acid: H₂SO₄ | | | | | | | | |
|---|---|---|---|---|---|---|---|---|
| | Run Number | | | | | | | |
| | 1 | 2 | 3 | 4 | 5 | 6 | 7 | 8 |
| 300 | J | J | J | J | I | C | C | C |

Examples 1–3 indicate generally that the gelation rate is accelerated considerably by increasing the relative concentration of simple mineral acid in the gelation solution up to a maximum relative concentration. Higher relative concentrations of mineral acid above the maximum do not accelerate the gelation rate.

EXAMPLE 4

A 2.2% by weight acrylamide polymer solution in fresh water is prepared. The polymer is 2.1% hydrolyzed and has a molecular weight of 11,000,000. A crosslinking agent solution is prepared separately containing 10% by weight chromic acetate complex and 1.0% by weight HCl in fresh water. The solutions are mixed in-line to form 130,000 liters of a gelation solution having a weight ratio of polymer to complex of 20:1. Simultaneous with in-line mixing, the gelation solution is injected into a production well in a very highly fractured West Texas carbonate reservoir at a rate of about 320 liter/minute where the tubing I.D. is about 5.05 cm. 8.2 meters of perforations are treated with the gelation at a depth of 410 meters.

The gelation solution has a residence time of 3.4 minutes in the tubing before exiting into the reservoir. The presence of HCl in the gelation solution assures sufficient partial gelation of the solution when it enters the near wellbore fracture environment to prevent it from also undesirably entering the matrix. The residence time would be insufficient to achieve sufficient partial gelation for this purpose if the HCl accelerator were not present in the gelation solution.

The gelation solution is cured for 48 hours in the reservoir to form a gel which substantially plugs the fracture network. After the treatment, the well is put back on production and exhibits improved reservoir conformance and reduced water to oil ratio of the produced fluids. Before treatment, the well produces 422,000 liters of fluid per day, including 7500 liters of oil per day and 414,000 liters of water per day for a water to oil ratio of 55. After treatment, the well produces 77,000 liters of fluid per day, including 10,000 liters of oil per day and 67,000 liters of water per day for a water to oil ratio of 6.7.

While foregoing preferred embodiments of the invention have been described and shown, it is understood that all alternatives and modifications, such as those suggested and others, may be made thereto and fall within the scope of the invention.

I claim:

1. A process for substantially reducing the permeability of a relatively high permeability region bounded by a relatively low permeability region in a hydrocarbon-bearing formation below an earthen surface penetrated by a wellbore in fluid communication with said relatively high permeability region, the process comprising the steps of:
   (a) mixing a simple mineral acid and a chromic carboxylate complex comprising a chromic species and a carboxylate species to form a crosslinking agent solution capable of crosslinking a watersoluble carboxylate-containing polymer, wherein said acid is present in said crosslinking agent solution in an amount sufficient to accelerate the crosslinking of said polymer relative to the crosslinking of said polymer with a crosslinking agent solution absent said acid;

(b) mixing said polymer and said crosslinking agent solution containing said chromic carboxylate complex and simple mineral acid at the surface to form a gelation solution;

(c) injecting said gelation solution into said wellbore;

(d) displacing said gelation solution into said relatively high permeability region; and (e) crosslinking said polymer to completion at an accelerated rate to form a gel which substantially reduces the permeability of said relatively high permeability region.

2. The process of claim 1 wherein the carboxylate species of said chromic carboxylate complex is acetate.

3. The process of claim 1 wherein said chromic carboxylate complex further comprises a species selected from the group consisting of oxygen species, hydroxide species and mixtures thereof.

4. The process of claim 1 wherein said carboxylate-containing polymer is an acrylamide polymer.

5. The process of claim 1 wherein said wellbore is a fluidproducing hydrocarbon production wellbore.

6. The process of claim 5 wherein fluid produced from said hydrocarbon production wellbore has a substantially reduced water to hydrocarbon ratio after said gel substantially reduces the permeability of said relatively high permeability region.

7. The process of claim 5 wherein hydrocarbon productivity from said wellbore is substantially increased after said gel substantially reduces the permeability of said relatively high permeability region.

8. The process of claim 1 wherein said wellbore is an injection wellbore.

9. The process of claim 1 wherein said relatively high permeability region is a fracture or a fracture network.

10. The process of claim 1 wherein said high permeability region is a matrix region of said formation.

11. The process of claim 1 wherein the weight ratio of said polymer to said crosslinking agent is about 5:1 to about 50:1 and the weight ratio of said chromic carboxylate complex to said simple mineral acid is to about 50:1 to about 2:1 in said gelation solution.

12. The process of claim 1 wherein said simple mineral acid is selected from the group consisting of hydrocloric acid, nitric acid, sulfuric acid, and mixtures thereof.

13. The process of claim 1 wherein said treatment region is an anomaly in or near said welbore penetrating said hydrocarbon-bearing formation.

14. A wellbore cementing process applied to a wellbore in fluid communication with a subterranean hydrocarbon-bearing formation below an earthen surface, comprising:

(a) mixing a simple mineral acid and a chromic carboxylate complex comprising a chromic species and a carboxylate species to form a crosslinking agent solution capable of crosslinking a water-soluble carboxylate-containing polymer, wherein said acid is present in said crosslinking agent solution in an amount sufficient to accelerate the crosslinking of said polymer relative to the crosslinking of said polymer with a crosslinking agent solution absent said acid;

(b) mixing said polymer and said crosslinking agent solution containing said chromic carboxylate complex and simple mineral acid at the surface to form a gelation solution;

(c) injecting said gelation solution into a volume in or adjacent said wellbore desired to be plugged via said wellbore; and (d) crosslinking said polymer to completion at an accelerated rate in said volume to form a cement gel which substantially plugs said volume.

15. The process of claim 14 wherein said carboxylate-containing polymer is an acrylamide polymer.

16. A process for fracturing a matrix of a subterranean hydrocarbon-bearing formation below an earthen surface comprising the steps of:

(a) mixing a simple mineral acid and a chromic carboxylate complex comprising a chromic species and a carboxylate species to form a crosslinking agent solution capable of crosslinking a water-soluble carboxylate-containing polymer, wherein said acid is present in said crosslinking agent solution in an amount sufficient to accelerate the crosslinking of said polymer relative to the crosslinking of said polymer with a crosslinking agent solution absent said acid;

(b) mixing said polymer and said crosslinking agent solution containing said chromic carboxylate complex and simple mineral acid which cross-links said polymer at an accelerated rate at the surface to form a fracturing fluid;

(c) injecting said fracturing fluid into said wellbore; and (d) displacing said fracturing fluid into said formation at a pressure above a fracturing pressure of said formation which substantially fractures said matrix of said formation.

17. The process of claim 16 wherein said carboxylate-containing polymer is an acrylamide polymer.

18. The process of claim 14 wherein the carboxylate species of said chromic carboxylate complex is acetate.

19. The process of claim 16 wherein said carboxylate species of said chromic carboxylate complex is acetate.

* * * * *